July 25, 1961     B. CRIST ET AL     2,993,624
BEVERAGE DISPENSER
Filed June 5, 1959

INVENTORS
Buckley Crist
BY Raymond L. Eddy

Harold F. Smith
ATTORNEY

United States Patent Office
2,993,624
Patented July 25, 1961

1

2,993,624
BEVERAGE DISPENSER
Buckley Crist, 25 Kimberly Lane, and Raymond L. Eddy, 3018 Riverside Ave., both of Muncie, Ind.
Filed June 5, 1959, Ser. No. 818,309
8 Claims. (Cl. 222—54)

This invention concerns improvements in the methods and means of dispensing powdered substances preferably with a quantity of a liquid added, to form a beverage. In its more limited aspects the invention is concerned with improved means for the making of a cup of coffee using the popularly known "instant coffee" with which a measured quantity of heated water is customarily admixed. While it will be understood that the invention is inherently applicable to the making and serving of other beverages, for example, soups, flavored drinks, and other liquid products using dehydrated ingredients, we will in the accompanying description refer to the device as a "coffee-maker."

A primary aim of the invention is the construction of a small compact unit into which a bulk supply of dehydrated stock, for example powdered coffee, may be placed and stored and from which unit charges may be dispensed into another part of the unit and there mixed with a quantity of heated water. The heated mixture is thereafter delivered into the cup of the one that operates the device.

A further aim of the invention is the construction of a dispenser in which a means is provided within the unit for heating the water or other liquid before it is mixed with the powdered ingredient. The main objective being to combine in one compact unit a simple and effective means for preparing and serving a hot drink without need to get out one or more bottles or jars, spoons, tea kettles or other accessories for heating the water, measuring the charge or strength, etc. and the attending clutter and cleanup that follows as was usually occasioned in the making of a cup of coffee.

With a device constructed according to the present invention the user takes a cup from the cupboard, fills it with water, pours it into the unit and places the cup under the serving spout. The operation of filling the cup with tap water automatically is a measure of the quantity of liquid to be used, and the pouring of the water into the unit automatically closes an electric circuit and the heating operation starts. After charging the unit with the water the user operates a dial that indicates the size of the charge of the powdered ingredient to be dispensed and operates another dial or lever by which the selected charge is dispensed from the bulk supply into a funnel shaped mixing chamber that underlies the water chamber. When the water has been heated to the temperature desired a valve is automatically opened, the hot water flows into the mixing funnel and with a swirling or whirlpool action, picks up the powdered charge and delivers the mixture to the user's cup beneath, the entire operation requiring but a few seconds. As the water leaves the heating chamber the electric circuit is automatically opened and the unit is again ready for the preparation and serving of another cup of the beverage.

In carrying forward these and other objectives of this invention we propose to combine in a single frame or unit, constructed for convenient wall mounting, three chambers namely, an ingredient chamber for the dry concentrate, a liquid-receiving chamber for the liquid portion, and a mixing chamber that is common to both and which receives the powder and liquid charges and for mixing preparatory to serving. The ingredient chamber is provided with an improved form of charge-measuring and dispensing mechanism that renders the powdered solid free-flowing and thereby assuring consistent accuracy in the amount delivered. The liquid chamber is provided with a heater that, preferably, is caused to respond to the conductivity of the water, and with a thermally controlled discharge valve. Thus, the presence of water in the unit acts as a "switch" to start the heating, and in the absence of water, the circuit is open and there is no current flow. The device is, accordingly, fail-safe in operation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as parts of this disclosure and, in such drawings, like characters of reference denote corresponding parts throughout all the views, of which:

FIGURE 1 of the drawings is a side elevation of a dispensing unit embodying the invention.

Figures 1, 2, 3:
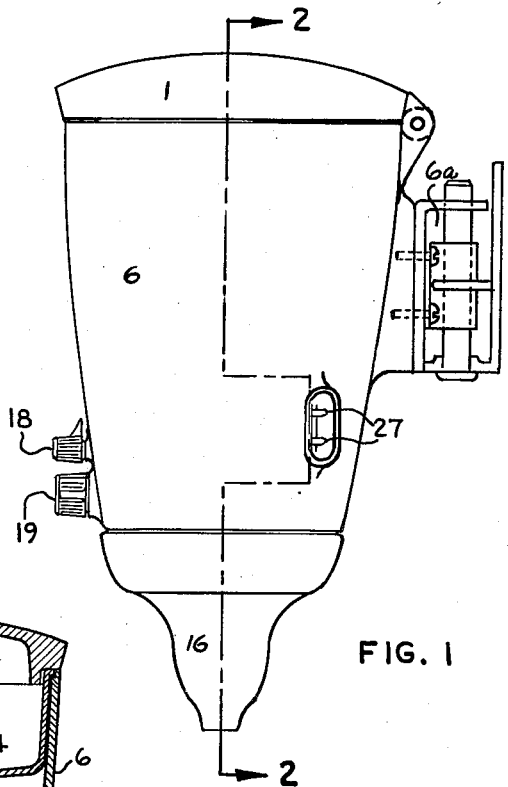
FIG. 2 is a vertical sectional view of the unit taken along line 2—2 of FIG. 1.
FIG. 3 is an inverted bottom view along line 3—3 of FIG. 2.

Referring more particularly to FIGS. 1 and 2 the assembled unit comprises a main housing 6 that has a funnel-shaped bottom portion 16, and a two-part hinged cover elements 1 and 2. One side of the housing is fitted with a receptacle 27 for a conventional service cord plug, the back with a bracket 6a designed for convenient attachment and disattachment to a wall or other support, and the front with control dials 18 and 19 that are to be operated in measuring and dispensing the charge of powdered ingredient.

As seen in FIG. 2, the main housing is divided by a transverse partition 6b and 6c whereby to form two chambers A and B, the former being adapted to receive and contain a bulk supply the powdered ingredient and the latter the water that is to be heated. Both of the chambers A and B communicate, as later will be explained, with a chamber C that forms the interior of the lower funnel-shaped portion 16.

The cover section 2 of the ingredient chamber A is provided with a vented sealing gasket 26 that keeps the bulk supply fresh and excludes moisture. The lower portion of the chamber A is fitted with a funnel-shaped flexible diaphragm 24, the walls of which are preferably stepped with the successive steps apexing at a delivery nozzle 24a. The lower end of the nozzle 24a is beveled as at 24b and normally closed by a hinged door 22. The door 22 is pivoted as at 22a to the free end of a lever 23 which in turn is pivoted to a stationary part of the housing such as at 22b.

The pivoted end of the trap door 22 is provided with a pair of radial arms 22b that straddle an actuating crank member 21 which has its pivotal axis at 21a in the main housing. The crank is operated from the exterior of the housing by turning of the knob 19. The relation of the radial arms 22b of the trap door to the pivot 22a and to the door 22 is such as to form a bell-crank type of lever that functions to swing the door to an open position as the crank is turned. Further turning of the crank 21 causes the door 22 and its pivot 22a to move upwardly and carries the spout 24a of the flexible diaphragm 24 with it. This movement partially collapses the diaphragm and places the contents of the ingredient chamber under a mild pressure so that a portion of the ingredients is caused to flow out the opened door and into the mixing chamber C below. The extent to which the diaphragm 24 is collapsed is controlled by a multi-sided cam 20 that lies in the plane of an arm of the crank 21. The cam 20 is connected to a shaft that extends through the housing as to be operable from the exterior by the dial 18. Turning of the dial from station to station will present a selected surface of the cam 20 in position to be engaged by the arm of the crank 21 and thus provide a simple means for regulating the extent the diaphragm is collapsed on each operating cycle, which in turn is a measure of the quantity of the ingredient that is to be dispensed into the mixing chamber. The trap door 22 is normally biased to its closed position by means of a return spring 30. In operation, the user sets the volume-control cam 20 at the desired quantity setting and then turns the dial 19 until movement is stopped by the volume cam and then releases the dial 19. As above indicated this operation opens the trap door 22 and then collapses the diaphragm and a selected quantity of the ingredient is dispensed. Upon release of the dial 19, the crank first tends to return to its normal position and closes the trap door 22, further downward movement of the crank carries the free end of lever 23 downwardly. The spout end of the flexible diaphragm is connected with the lever 23 and the downward movement of the latter extends the diaphragm. Replacement air is drawn into the chamber through a flap valve 26 in its top. It will be seen that the bellows-action described not only expels air and ingredients from the bottom of the storage chamber but tends to agitate the material and keep it free flowing.

The water chamber B is equipped with a heating element here shown as a pair of spaced carbon electrodes 7 and 8 located in the lower part of the chamber. When the electrodes are submerged in tap water a circuit is completed through the water and the water instantly begins to heat.

Below the electrodes is a discharge opening b that is normally closed by a valve 15. The stem 14 of the valve is connected to one end of a thermally responsive bellows 12 which operates to open the valve when the temperature of the water surrounding the bellows reaches the desired degree of heat. The other end of the thermally responsive bellows is adjustably secured to a stationary part of the valve frame 13, as by means of a screw and nut 12a. By adjusting the normally stationary end of the thermal bellows axially the valve-opening temperature may be controlled to suit individual requirements. As illustrated in FIG. 2 the upper portion of the water heating chamber is equipped with a baffle or grill 4 that serves as a guard to prevent one from inserting a spoon or a finger into the chamber where contact with the electrodes would be hazardous.

When the water has been heated to the temperature desired, the valve 15 automatically opens and the hot water drains into the mixing chamber C. The chamber C is provided by the funnel section 16 whose interior surface is spirally ribbed as at 16a so as to deflect the water in a spiraling or swirling path as it flows toward the outlet 16b. Having previously dispensed a quantity of the powdered ingredient on a relatively flat portion 16c of the funnel section in the path of the swirling hot water, the water picks up the ingredient and delivers it in a mixed state to the user's cup that previously has been placed below the outlet 16b.

As the heated water drains from the heating chamber B, the carbon electrodes become uncovered and the electric circuit is automatically "opened." With a heater of this character there is little danger of one inadvertently leaving the heater turned on. The rate at which the water is heated is determined by the spacing of the electrodes 7 and 8 and for that purpose one electrode is made adjustable relative to the other as by means of an insulated adjusting screw 10.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, the following combinations and elements, or equivalents thereof are claimed by Letters Patent of the United States:

1. In a device of the character described the combination of a main housing divided so as to form a stock chamber adapted to contain a quantity of dehydrated ingredient and a liquid chamber, each of said chambers having a valved outlet in its lower end, and each chamber communicating on the downstream side of its respective valve with a common mixing chamber in which an outlet is formed, means in the liquid chamber responsive to the presence of liquid therein for heating the liquid, means also in said liquid chamber responsive to the temperature of the liquid being heated to actuate the associated said valve, said means functioning to open the valve when the liquid reaches a selected temperature, said stock chamber having a flexible lower diaphragm containing its valved outlet, and manually operable means operatively associated with the valved outlet of the stock chamber for actuating the valve to open position and for flexing the said diaphragm thereby to discharge a portion of the dehydrated ingredient from the stock chamber to the said mixing chamber, the operational sequence being such that the heated liquid subsequently flowing from the liquid chamber to the mixing chamber mixes with the dehydrated ingredient previously placed therein as the liquid flows toward the outlet formed in the mixing chamber.

2. The combination of claim 1 including adjustable means operatively associated with the valved outlet of the stock chamber for controlling the extent the diaphragm is flexed upon operation of the valve actuating means thereby to provide a measure of the dry ingredient dispensed on each operational cycle.

3. The combination of claim 1 in which the flexible diaphragm containing the valved outlet from the stock chamber is conical in shape and arranged to be collapsed bellows-fashion upon operation of the valve actuating means, the collapsing action tending to place the ingredient under a mild pressure at the time of discharge and simultaneously agitating the ingredient remaining in the stock chamber.

4. A device of the character described combining a main housing divided so as to form a stock chamber adapted to contain a quantity of dehydrated ingredient and a liquid chamber, said stock chamber having a flexible lower wall, each of said chambers being normally closed at its lower end by means of a valve, and each chamber communicating on the downstream side of its respective valve with a common mixing chamber in which an outlet is formed, means in the liquid chamber for heating a quantity of liquid placed therein, thermally controlled means also in said liquid chamber responsive to the temperature of the liquid being heated to actuate the valve therein, the said thermal means functioning to open its associated valve when the liquid reaches a selected temperature, means operatively associated with the valve of the stock chamber and with the flexible lower wall thereof actuating the valve to open position and for simultaneously flexing the lower wall of the chamber thereby to dispense a portion of the dehydrated ingredient from the stock chamber to the said mixing chamber, the operational sequence being such that the heated liquid on reaching the selected temperature causes the thermal means to respond to open the valve of the liquid chamber so that the liquid may flow from the liquid chamber through the mixing chamber and mix with the dehydrated ingredient previously placed therein as the liquid flows toward the outlet formed in the mixing chamber.

5. A device for dispensing a measured charge of powdered ingredient combining a main housing having a storage chamber for a bulk supply of the ingredient and a charge-receiving chamber, said storage chamber having a flexible, conically shaped, lower wall with an outlet opening therein leading to the charge-receiving chamber, normally closed valve means operatively associated with the said outlet opening, means including a lever operative from the exterior of the main housing for actuating said valve means to open position and for flexing said conically shaped lower wall so as to place the ingredient in the storage chamber under a mild pressure at the time of discharge and simultaneously agitating the ingredient to render it free-flowing, and adjustable means for limiting the extent of flexing movement imparted to the said lower wall so as to provide a measure of the quantity of ingredient discharged on each operational cycle.

6. The combination of claim 5 in which the means for limiting the extent of flexing movement imparted to the lower wall of the storage chamber comprises a rotatable cam element having a progressively varying contour interposed in the path of movement of said lever and operative on being rotated from station-to-station to proportionately determine the movement of the said lever.

7. Apparatus for dispensing a measured quantity of a powdered ingredient combining a housing affording a chamber for receiving the ingredient in bulk, said housing having a flexible conically shaped lower wall with a discharge opening at its apex, a lever pivoted at one end to the housing and having its free end connected with the said flexible lower wall, normally closed valve means connected with said lever and operatively associated with the discharge opening in the said lower wall for controlling the flow of ingredient therethrough, crank means operatively connected with said valve means and with the free end of said lever for actuating the said valve means to an open position and thereafter to actuate the said lever from an extended position to a retracted position so as to flex the said lower wall, the action being such as to agitate the powdered ingredient and render it free-flowing, and means for limiting the movement imparted to the said crank means whereby to control the extent of flexing of the lower wall and the quantity of ingredient discharged.

8. The combination of claim 7 in which said lever is normally spring biased to its extended position automatically to effect retraction of the flexible lower wall of the housing on completion of dispensing cycle.

References Cited in the file of this patent

UNITED STATES PATENTS

| | | |
|---|---|---|
| 2,231,211 | Halsey et al. | Feb. 11, 1941 |
| 2,802,599 | Callahan et al. | Aug. 13, 1957 |
| 2,883,921 | Morrison | Apr. 28, 1959 |
| 2,903,163 | Newman | Sept. 8, 1959 |